W. SEBELIN.
ANIMAL TRAP.
APPLICATION FILED APR. 9, 1908.
905,006.
Patented Nov. 24, 1908.
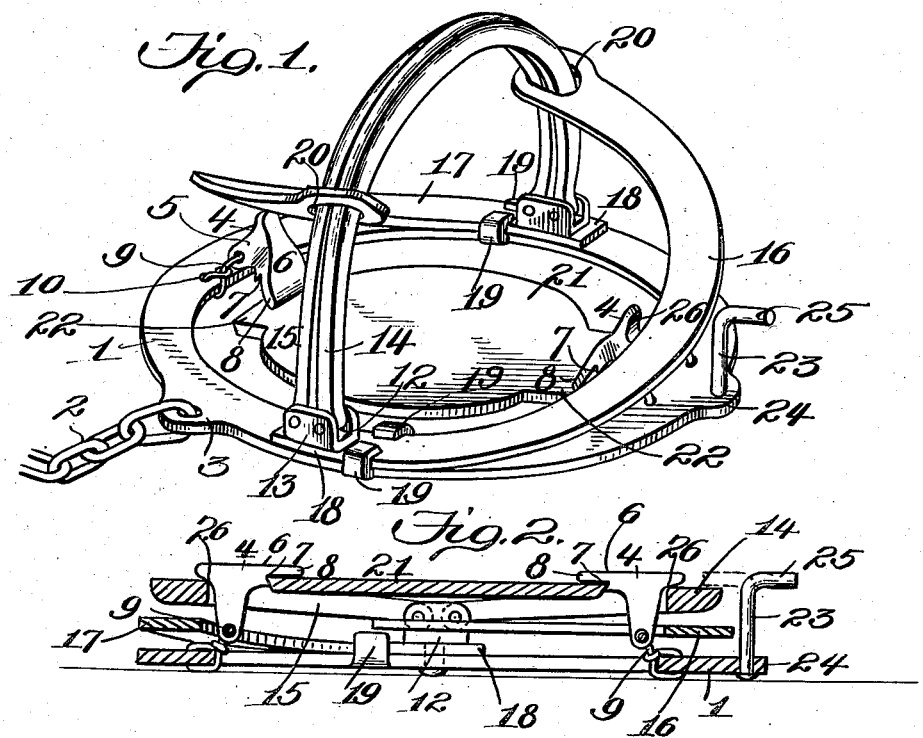

UNITED STATES PATENT OFFICE.

WILLIAM SEBELIN, OF SUNFIELD, IDAHO.

ANIMAL-TRAP.

No. 905,006.  Specification of Letters Patent.  Patented Nov. 24, 1908.

Application filed April 9, 1908. Serial No. 426,120.

*To all whom it may concern:*

Be it known that I, WILLIAM SEBELIN, a citizen of the United States, residing at Sunfield, in the county of Lemhi and State of Idaho, have invented new and useful Improvements in Animal-Traps, of which the following is a specification.

This invention relates to an improvement in animal traps, the object being to so construct and arrange the several parts of a trap of this type that the jaws will be sensitive to release by the animal.

A further object of the invention is to simplify the construction of animal traps and to insure a positive operation of the jaws through the medium of peculiarly disposed springs.

The invention consists in the construction and arrangement of the several parts which will be more fully hereinafter specified.

In the drawing: Figure 1 is a perspective view of a trap embodying the features of the invention and showing the parts as they appear when the jaws are closed or prior to setting. Fig. 2 is a transverse vertical section of the trap showing the parts in set condition. Fig. 3 is a transverse vertical section of a trap showing the parts released and the jaws closed. Fig. 4 is a detail perspective view of one of the platform securing dogs and a part of the base.

Similar characters of reference are employed to indicate corresponding parts in the several views.

The numeral 1 designates an annular base constructed of suitable metal and of any diameter. As usual in traps of this character, a securing chain or analogous device 2 is attached to the base 1 through the medium of an apertured lug or ear 3 with which one of the links of the chain is in engagement. At diametrically opposite points dogs 4, shown in detail by Fig. 4, are secured to the base, each dog comprising a shank 5 having a projecting head 6 of the form shown. The head 6 is diverged towards its inner extremity and is undercut as at 7 to provide an engaging lip or flange 8. The lower terminal of the shank 5 is apertured and secured to the inner periphery of the base by a wire loop 9 inserted therethrough and also through openings 10 in the base, the terminals 11 of the wire being twisted around and interlocked to portions of the loop 9 on opposite sides of the lower end of the shank 5. Each dog is similarly secured to the base and is free to move, and when released will gravitate inwardly owing to the preponderance of weight being at the inner part of the head 6. Jaw-attaching members or posts are also applied to the base at diametrically opposite points and are disposed in transverse alinement in planes at right angles to the dogs 4. The jaw-attaching members or posts 12 have upper flanged heads 13 in which the ends of jaws 14 and 15 are pivotally held in close relation, the shanks of the securing members or posts 12 projecting through and suitably secured to the base 1.

In the present form of trap the jaws 14 and 15 are opened against the resistance of reversely arranged spring tongues 16 and 17 having their lower extremities 18 held flat against the base 1 and secured by the posts or shanks of the said posts 12, which also pass therethrough. Adjacent to the posts 12 the base 1 is provided with pairs of embracing flanges 19 which extend up over the top surfaces of the spring tongues 16 and 17, as clearly shown by Fig. 1, and by this means the spring tongues are held in place or prevented from shifting when operated or depressed by the opening movement of the jaws 14 and 15 and during the closing of the said jaws when the trap is released. The spring tongues 16 and 17 gradually extend upwardly in curved inclined planes and have elongated eyes 20 through which opposite portions of the jaws 14 and 15 extend, the free extremities of the spring tongues being free to slide or move over the jaws without any tendency to binding. When the spring tongues 16 and 17 are released, the free ends having the elongated eyes 20 therein slide upwardly over opposite portions of the jaws 14 and 15 and occupy positions sufficiently high above the points of pivotal attachment of the jaws to maintain the latter in upright closed position, the said spring tongues being semicircular in their contour and when depressed will lie over the portions of the base 1 beneath them. The upward incline or flare of each spring tongue from its point of attachment to its free extremity is conducive to a sensitive operation of the jaws when released, and the free extremities of both spring tongues engaging the jaws at a distance above the pivotal points of the latter will prevent loose movement of the jaws with respect to each other when closed and resist the efforts of a trapped animal to release himself, particularly in view of the lateral resistance in opposite directions of the free extremities of the spring tongues on the jaws. In this connection it will be understood that the spring tongues may be depressed easily in opening the jaws 14 and 15 when both jaws are manually engaged and equally depressed against the spring tongues, but there will be no outward yield of the spring tongues and consequently a caught animal will be held fast. A further advantage of the particular form of spring tongues or closing means for the jaws 14 and 15 is that the said tongues or closing means lie within the plane of the base 1 and do not project outwardly beyond the latter, and hence the trap may be more readily concealed when set. Moreover, the arrangement of the spring tongues or resilient closing means for the jaws as specified makes it possible to produce a trap of compact form or one without objectionable projections beyond the base.

In this improved trap the platform or pan 21 is loose or normally unattached to any part of the base, jaws, spring tongues or dogs, and preferably consists of a flat metal plate of approximately circular form having oppositely disposed projections or ears 22 to engage the flanged heads of the dogs 4. In setting the trap the jaws 14 and 15 are opened and pressed downwardly against the resistance of the spring tongues 16 and 17, the dogs 4 being turned inwardly as shown by Figs. 1 and 3 so as to avoid interference with the depression of the said spring tongues. To temporarily hold the jaws open against the resistance of the spring tongues and prior to the engagement of the platform or pan 21 with the dogs 4 a locking means is provided consisting of a rotatable latch having a vertical shank 23 with its lower end rotatably mounted in a lug or ear 24 forming part of the base 1 and its upper end or extremity angularly bent to produce a catch head 25. When the jaws are opened they are held in such position by turning the catch head 25 of the temporary lock inwardly over the jaw 14, as indicated by dotted lines in Fig. 2. The platform or pan 21 is raised or brought up into operative position with relation to the dogs 4, the latter being first moved outwardly to cause the outer under portions 26 of the heads 6 to clear the central opening of the base and to institute a contact of the said portions 26 with the inner upper portions of the jaws 14 and 15, as shown by Fig. 2. The platform or pan 21 is then assembled in relation to the dogs by causing the projections 22 to become seated in the undercut inner extremities 7 of the heads 6 of the dogs beneath the flanges 8, the outer terminating walls of the undercut portions of the flanges and the end walls or edges of the projections 22 being suitably inclined or beveled to effect a reliable engagement of the platform or pan with the dogs without detracting from the sensitiveness of the trap. As in all traps of this class, the bait is so disposed, when bait is used, that the animal will have to step into the trap to reach the bait and thereby engage the platform 25 between the open jaws and depress the said platform and release the several parts and permit the jaws to close. When the trap is released or sprung, the platform 21 falls out of engagement with the dogs 4 and within the annular base 1, the dogs both moving inwardly for reasons hereinbefore explained.

The improved trap will be found very efficient in its operation and convenient not only when setting the same, but also when stored or in a position of disuse, and it is obvious that changes in the proportions, dimensions and minor details may be made without departing from the spirit of the invention.

Having thus fully described the invention, what is claimed as new, is:

1. A trap of the class specified having a base, a central platform loosely and detachably held within the confines of the base, spring-actuated jaws hinged to the base, and means engaging the jaws to hold them in open position and also for engaging the platform, the latter being separable from the said means and remaining parts of the trap when depressed to release the jaws and falling within the confines of the trap base.

2. A trap of the class specified comprising a base, a pair of jaws hinged to the base at diametrically opposite points, spring tongues of semicircular form disposed within the confines of the base and having one extremity of each secured to the base and the opposite free extremity loosely embracing the jaws, the free extremities of the tongues engaging opposite portions of the jaws, and a platform held within the confines of the base, the platform becoming wholly detached from the parts of the trap when the jaws are released.

3. A trap of the class specified having an annular base, automatically closing jaws supported on the base, and a platform loosely held within the confines of the base and becoming fully detached from the remaining parts of the trap when the latter is sprung by depression of the said platform and the jaws closed, the detached platform being depressible within the annular base.

4. A trap of the class specified having a base, automatically closing jaws, a platform or bait support which becomes wholly detached from the parts of the trap when the jaws are released, and oppositely disposed devices for engaging the platform or bait support when the trap is set.

5. A trap of the class specified having automatically closing jaws, a platform or bait support which becomes wholly detached from the parts of the trap when the jaws are released, and means for engaging opposite portions of the platform when the trap is set.

6. A trap of the class specified having a base, automatically closing jaws, a platform or bait support which becomes wholly detached from the parts of the trap when the jaws are released, and oppositely disposed inwardly gravitating devices for engaging the platform when the trap is set.

7. A trap of the class specified having a base, automatically closing jaws, a platform or bait support which becomes wholly detached from the parts of the trap when the jaws are released, and oppositely disposed inwardly movable devices for engaging the platform and the jaws when the trap is set.

8. A trap of the class specified having an annular base, automatically closing jaws supported on the base, a platform or bait support which becomes wholly detached from the parts of the trap when the jaws are released, and oppositely disposed inwardly movable devices loosely secured to the inner periphery of the base for engaging the platform and the jaws when the trap is set.

9. A trap of the class specified having an annular base, automatically closing jaws supported on the base, a platform or bait support loosely held within the confines of the base and becoming fully detached from the remaining parts of the trap when the latter is sprung and the jaws closed, and oppositely disposed dogs movably connected to the inner periphery of the base and having heads with inner undercut flanged portions to engage the platform or bait support and also provided with outer projections to bear on the jaws when the latter are set.

10. A trap of the class specified having an annular base, automatically closing jaws held on the base, a platform loosely disposed within the confines of the base and becoming wholly detached from the remaining parts of the trap when the jaws are released, the platform having opposite projections, and inwardly movable dogs attached to the base and having heads with undercut flanged portions to engage the projections of the platform and outer extending means to bear on the jaws when the trap is set.

11. A trap of the class specified having a base, automatically closing jaws supported by the base, reversely arranged spring tongues of semi-circular form disposed within the confines of the base and having one extremity of each secured to the base and the opposite free extremity loosely embracing the jaws, the free extremities of the tongues engaging opposite portions of the jaws, a platform located within the base and becoming wholly detached from the parts of the trap when the jaws are released, and means for engaging opposite portions of the platform when the trap is set.

In testimony whereof I have hereunto set my hand in presence of two subscribing witnesses.

WILLIAM SEBELIN.

Witnesses:
 CHAS. HOLBROOK,
 GEORGE HOLBROOK.